United States Patent [19]

Boudreau

[11] Patent Number: 5,285,932
[45] Date of Patent: Feb. 15, 1994

[54] APPARATUS FOR DELIVERING FLUIDS IN PROPORTIONAL QUANTITIES

[76] Inventor: Ronald A. Boudreau, 3421 Dragoo Park Dr., Modesto, Calif. 95350

[21] Appl. No.: 792,450

[22] Filed: Nov. 15, 1991

[51] Int. Cl.⁵ .............................................. B67D 5/52
[52] U.S. Cl. .................................. 222/137; 222/255; 417/469; 417/511
[58] Field of Search ............... 222/145, 134, 137, 249, 222/255, 372; 417/469, 511

[56] References Cited

U.S. PATENT DOCUMENTS

| | | | |
|---|---|---|---|
| 3,149,756 | 9/1964 | Caprigiani | 222/137 |
| 3,499,387 | 3/1970 | Zippel | 222/137 |
| 3,642,175 | 2/1972 | Robbins | 222/255 X |
| 4,363,426 | 12/1982 | Heinzl et al. | 222/134 |
| 4,983,103 | 1/1991 | Ogawa | 417/401 X |
| 5,133,483 | 7/1992 | Buckles | 222/255 |

FOREIGN PATENT DOCUMENTS

971034  7/1975  Canada .................. 417/511

*Primary Examiner*—Andres Kashnikow
*Assistant Examiner*—Kenneth Bomberg
*Attorney, Agent, or Firm*—Robert S. Smith

[57] ABSTRACT

An apparatus for mixing two fluids in precise proportions which includes a quantifying meter and a concentrate meter. The apparatus also includes apparatus connecting the quantifying meter and the concentrate meter to simultaneously operate the quantifying meter and concentrate meter. The quantifying meter includes a servo plunger that is elongated and further includes a piston and a sealing member. The piston and the sealing member are axially spaced and the quantifying meter also includes a servo piston having a central bore in which the servo plunger is disposed in coaxial relationship with the piston in sealing engagement with the central bore. The servo piston includes a pressure fluid entrance port and an axially spaced outlet bore. The sealing member covers the outlet bore when the servo plunger is in a first position and the quantifying meter further includes a quantifying meter body having a bore in which the floating valve is disposed with the outer surface of the floating valve in sealing engagement with the bore in the quantifying meter body. The quantifying meter further includes a first valve apparatus and a second valve apparatus; the first valve apparatus cooperates with the second valve apparatus in one position of the floating valve.

11 Claims, 6 Drawing Sheets

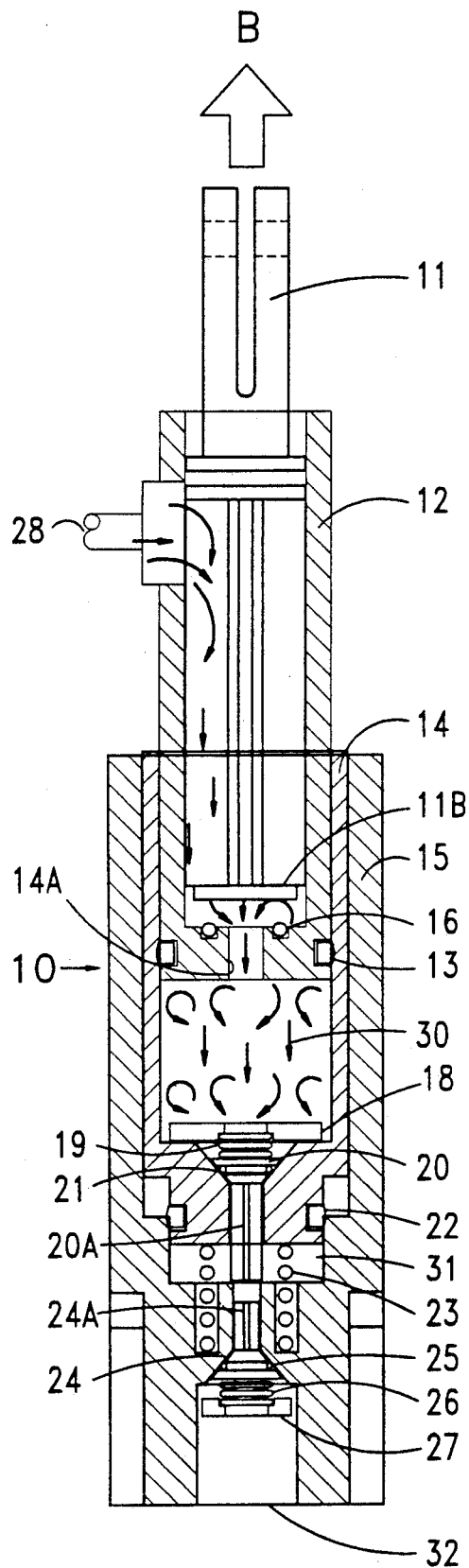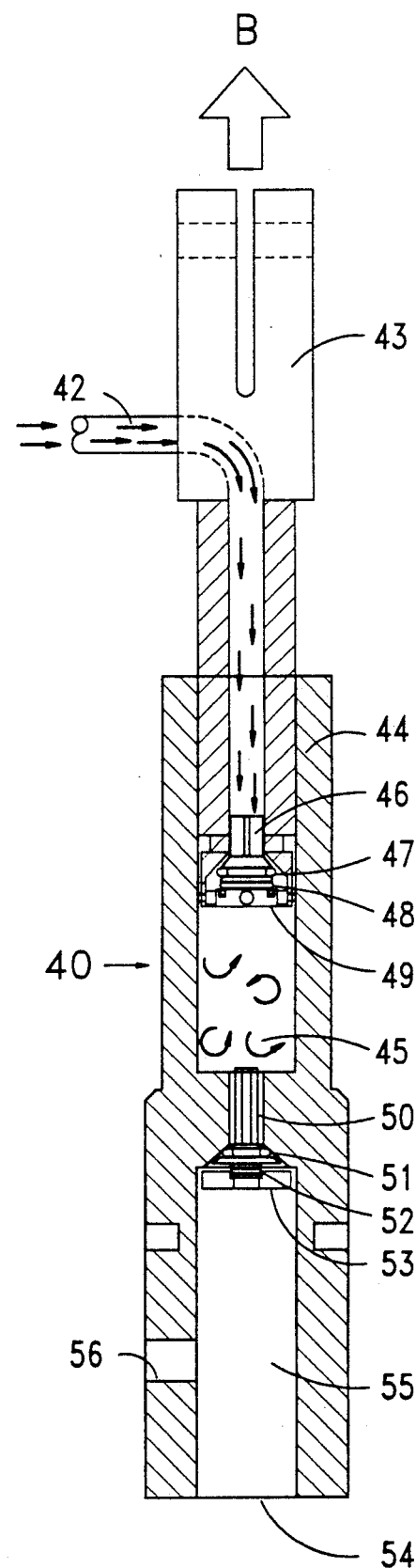
FIGURE 3A
FIGURE 3B

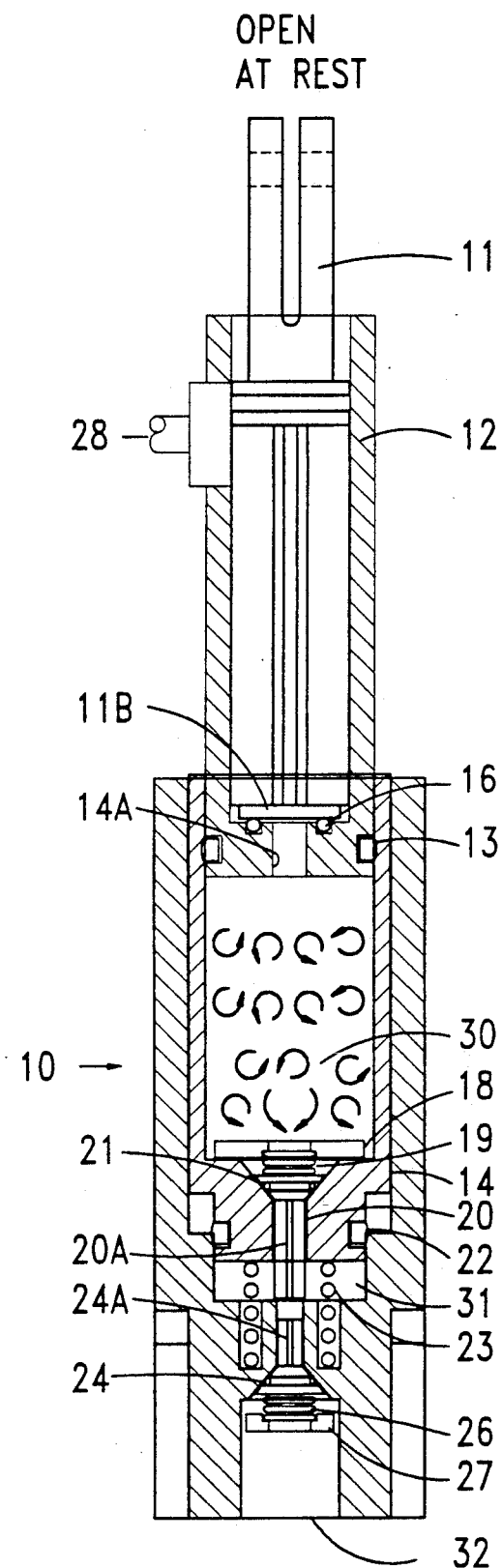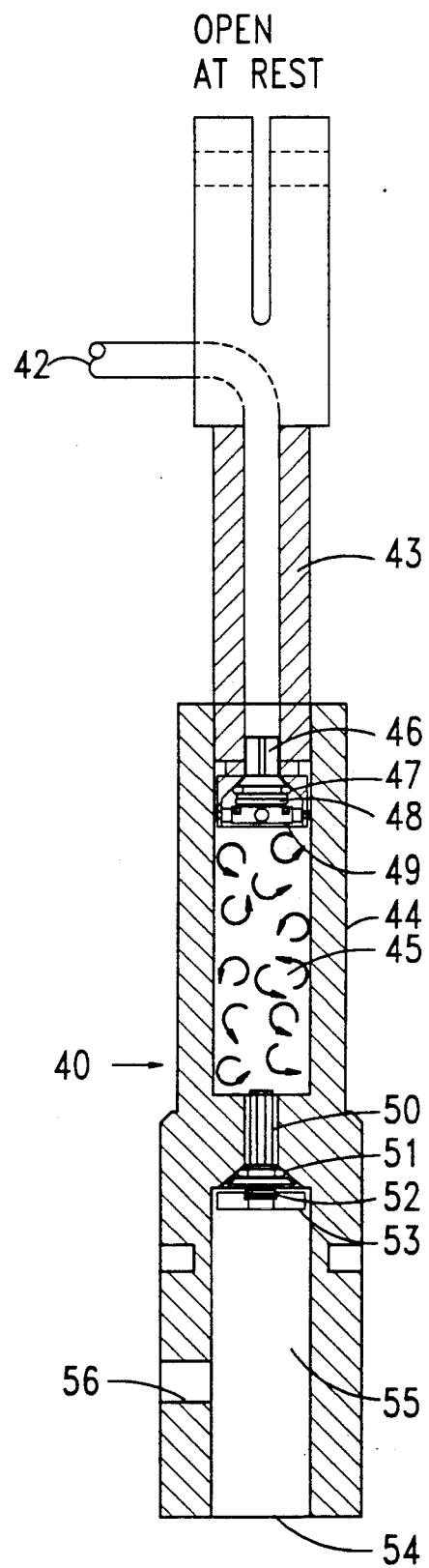
FIGURE 4A
FIGURE 4B

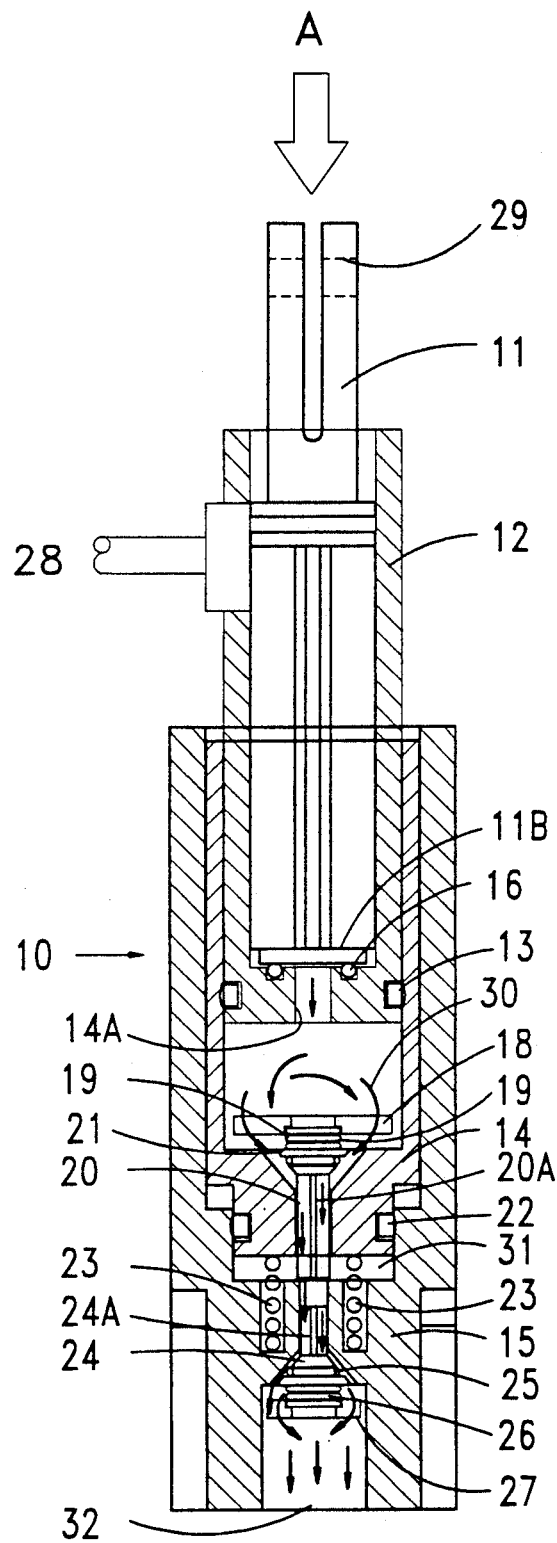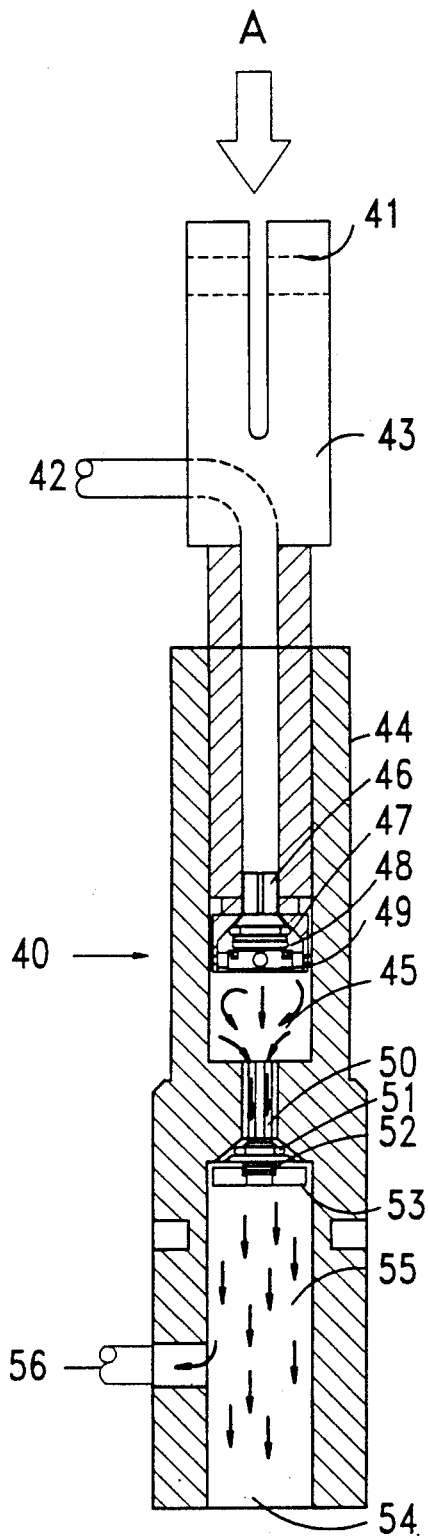
FIGURE 5A
FIGURE 5B

APPARATUS FOR DELIVERING FLUIDS IN PROPORTIONAL QUANTITIES

BACKGROUND OF THE INVENTION

The invention relates to apparatus for metering two liquids in precise proportions to make a solution having a specific concentration. While the invention has particular application to mixing solutions used for agricultural applications including germicides, disinfectants and other chemicals.

At least in some cases the use of too little concentrate or lower concentration will be ineffective and will not achieve the intended purpose. Also, at least in some cases the use of two much concentrate will produce an undesirable result and/or increase the expense of a given process.

Additional considerations in providing such apparatus are the variation in inlet pressure for at least one of the fluids. More particularly, one of the fluids may be water or other diluent that is provided at tap pressure. This pressure may vary widely, particularly in farm environments. An inlet pressure range of 20 to 120 pounds per square inch is possible.

It is also of great importance to prevent problems with microorganisms in the mixed fluids. More particularly, Pseudomonas is one kind of microorganism that can be a problem with water that is not contained within a pipe. Accordingly, it is essential that the diluent not be exposed to ambient air.

The apparatus must also be capable of meeting various constraints imposed by the United States Food and Drug Administration.

It is an object of the invention to provide metering apparatus that will provide extremely accurate metering of two or more fluids.

It is another object of the invention to provide apparatus that can be used easily without special training.

It is also an object of the invention to provide apparatus which can be mass produced and which will still produce consistent results.

Another object of the invention is to provide apparatus which will function over a very wide pressure range.

Yet another object of the invention is to provide apparatus that will mix fluids with an accuracy of at least 0.1% and preferably an accuracy of 0.01%.

SUMMARY OF THE INVENTION

It has now been found that these and other objects of the invention may be attained in an apparatus for mixing two or more fluids in precise proportions which includes a quantifying meter and a concentrate meter. The apparatus also includes means connecting the quantifying meter and the concentrate meter to simultaneously operate the quantifying meter and concentrate meter. The quantifying meter includes a servo plunger including means for coupling to the means to simultaneously operate. The servo plunger is elongated and further includes a piston and a sealing member. The piston and the sealing member are axially spaced and the quantifying meter also includes a servo piston having a central bore in which the servo plunger is disposed in coaxial relationship with the piston in sealing engagement with the central bore. The servo piston includes a pressure fluid entrance port and an axially spaced outlet bore. The sealing member covers the outlet bore when the servo plunger is in a first position and the quantifying meter further includes a quantifying meter body having a bore in which the floating valve is disposed with the outer surface of the floating valve in sealing engagement with the bore in the quantifying meter body. The quantifying meter further includes a first valve means and a second valve means; the first valve means cooperates with the second valve means in one position of the floating valve.

In some forms of the invention the first and second valve means have mutually aligned stems. The first valve may open in response to movement of the floating valve. The second valve unseats in response, in part, to the movement of the servo piston relative to the floating valve. The quantifying meter may further include a pressure balancing spring that biases the floating valve away from the second valve. The concentrate meter may include a concentrate meter body and a concentrate piston.

In some forms of the invention the concentrate piston includes a concentrate entrance port extending generally axially within the concentrate piston. The concentrate piston may be elongated and includes a concentrate piston poppet valve at one axial extremity. The concentrate meter body may include a bore and the concentrate piston may be dimensioned and configured for sliding and sealing engagement with the bore.

The bore in the concentrate meter body may be axially aligned with a concentrate body poppet valve for allowing passage of fluid out of the concentrate meter body. The quantifying meter and concentrate meter may each have outlet ports and the apparatus may include means connecting the respective outlet ports for fluid communication.

BRIEF DESCRIPTION OF THE DRAWING

The invention will be better understood by reference to the accompanying drawing in which:

FIG. 3a is a schematic of the quantifying meter upon still further movement of the servo plunger.

FIG. 3b is a schematic of the concentrate meter upon still further movement of the concentrate piston 43.

FIG. 4a is a schematic of the quantifying meter at the top of the stroke of the servo plunger.

FIG. 4b is a schematic of the concentrate meter at the top of the stroke of the concentrate piston.

FIG. 5a is a schematic of the quantifying meter as the servo plunger moves downwardly.

FIG. 5b is a schematic of the concentrate meter 40 showing the concentrate piston as it moves downwardly.

DESCRIPTION OF THE PREFERRED EMBODIMENT

Figure 1A:
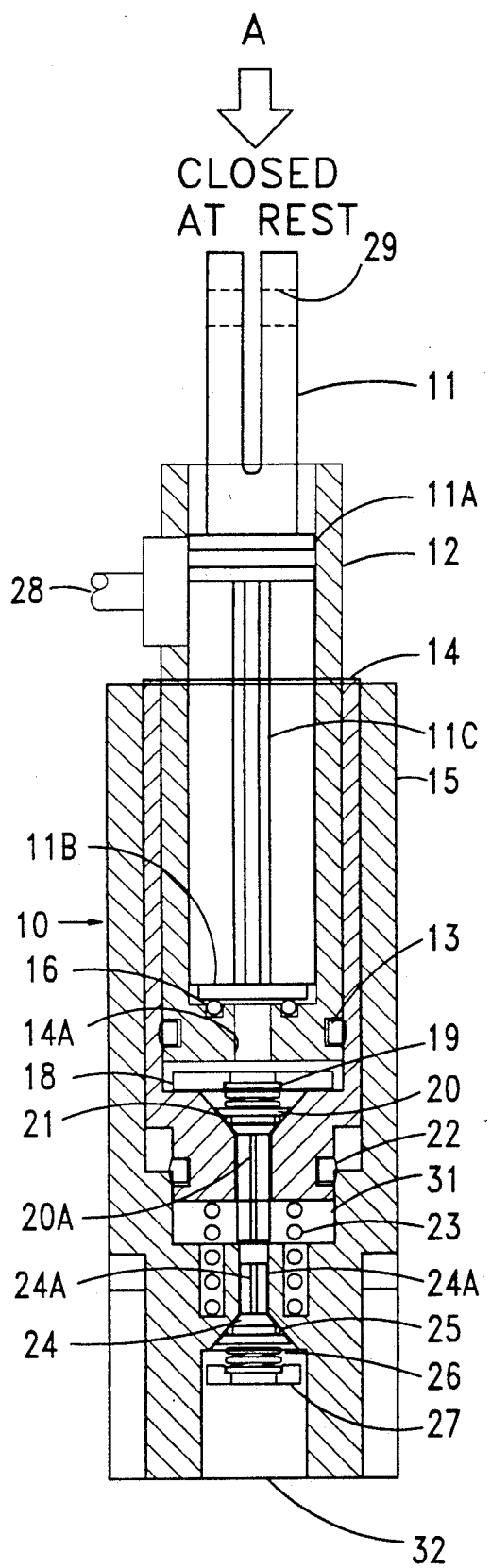
FIG. 1a is a schematic of a quantifying meter which is one of two major parts of a proportioning pump in accordance with one form of the invention and which illustrates the initial closed position.
Figure 1B:
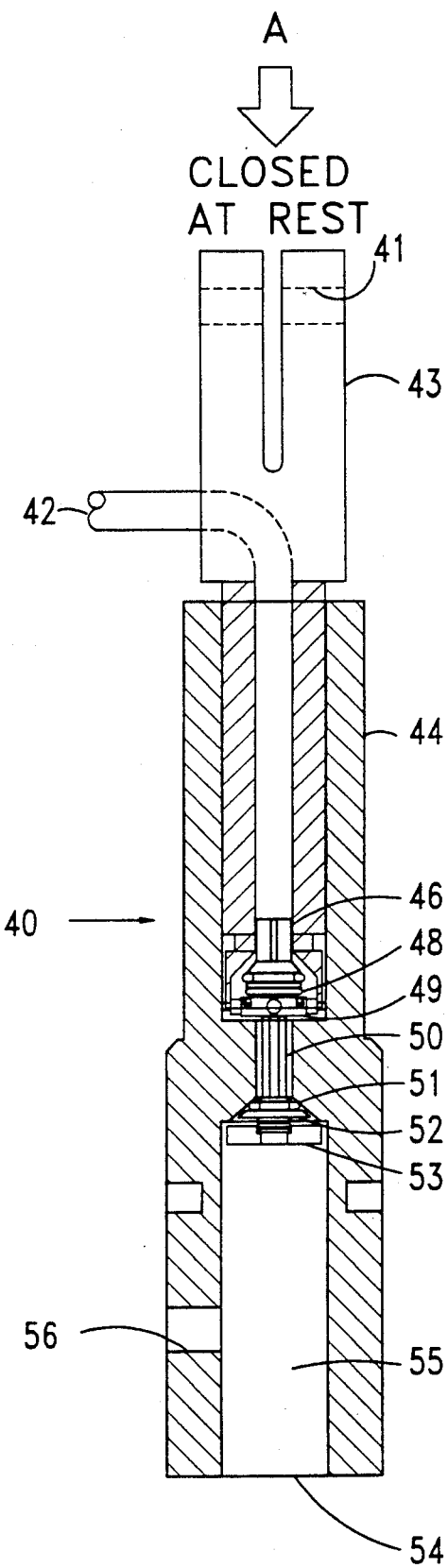
FIG. 1b is a schematic of a concentrate meter which is a second of two major parts of the proportioning pump in accordance with one form of the invention and which illustrates the initial closed position thereof.

The general structure of the apparatus in accordance with the invention will first be described followed by a description of the operation. Referring now to FIGS. 1a-6 there is shown a proportioning or metering pump 1 that includes a base 4 to which a quantifying meter 10 and a concentrate meter 40 are connected by respective pivots 6, 8 at a first axial extremity of each. Respective second axial extremities 6A, 8A are connected by a yoke or U-shaped member 9. Application of a force A operates the quantifying meter 10 and the concentrate meter 40 simultaneously. In other forms of the invention the bar 9 may be yoke or U-shaped and quantifying meter 10 and concentrate meter 40 may be coupled to the yoke member at different spacings along the member to provide a different ratio of concentrate to water or other diluent. In other forms of the invention additional meters may be attached to the yoke 9 to mix additional fluids.

The concentrate meter 40 is of more simple construction that the quantifying meter 10. More particularly, the concentrate meter 40 includes a concentrate meter link hole 41 for attachment to the yoke or bar 9. The concentrate meter link hole 41 is disposed in the concentrate piston 43 which includes an upper portion and a generally cylindrical lower portion that slides in bore within a concentrate meter body 44. The concentrate piston 43 includes an axially extending bore that is in fluid communication with a concentrate entrance port 42. A flexible tube connects the concentrate entrance port 42 to a reservoir (not shown) of concentrate.

A concentrate piston poppet valve 46 is disposed at the bottom of the concentrate piston 43. The purpose of the concentrate piston poppet valve 46 is to seal the axial bore in the concentrate piston 43 when the concentrate piston 43 is withdrawn from the concentrate meter body 44. More particularly, the concentrate piston poppet valve 46 is biased to the closed position by a concentrate piston poppet valve spring 48 causing the concentrate piston poppet valve 46 to seat against a concentrate piston poppet valve seal 47. The concentrate piston poppet valve spring 48 is positioned by concentrate piston poppet valve spring retainer 49.

As the concentrate piston 43 is withdrawn from the concentrate meter body 44 a vacuum will be generated in a concentrate chamber 45 defined within the bore within the concentrate meter body 44 below the concentrate piston 43. As the vacuum increases to a value that is sufficient to overcome the concentrate piston poppet valve spring 48 concentrate will be drawn into the concentrate entrance port 42 and fill the bore within the concentrate piston 43 and then enter the concentrate chamber 45. It will thus be seen that a precise quantity of fluid will be trapped in the concentrate chamber 45. This quantity is a function of the stroke of the concentrate piston 43.

As the concentrate piston 43 is thereafter moved downwardly the fluid in the concentrate chamber 45 is pressurized by the descending concentrate piston 43. Disposed within the concentrate meter body 44 is a concentrate body poppet valve 50. When the pressure in the concentrate chamber 45 is sufficient to overcome the force of the concentrate body poppet valve spring 52 which biases the concentrate body poppet valve 50 the fluid will pass from concentrate chamber 45 to premix chamber 55. The port 54 from quantifying meter 40 is disposed in fluid communication with quantifying meter fluid exit port 32. Thus the fluid from quantifying meter 10 and concentrate meter 40 are mixed and sent out a mixed solution exit port 56 to an accumulator 57 before passing via tube 59 to the point of ultimate use.

The quantifying meter 10 includes a servo plunger 11 which has a quantifying meter link hole 29 for cooperation with the bar 9. The servo plunger 11 includes a piston 11A that slides in coaxial sealing engagement with the inner wall of a servo piston 12. A sealing member 11B is also part of the servo plunger 11. The sealing member 11B is disposed in axially spaced relationship with respect to the piston 11A. A relatively slender spacer member 11C separates the piston 11A and the sealing member 11B. The servo piston 12 is a generally cylindrical member that slides in coaxial sliding engagement in a quantifying meter body 15. A servo piston seal 13 is disposed on the circumference of the servo piston 12 to seal the outer face thereof to the bore of the quantifying meter body 15.

The pressure fluid entrance port 28 of the servo piston 12 is coupled to a water line which will have water under pressure disposed within it. As water (or other diluent under pressure) is admitted into the pressure fluid entrance port 28 it can initially pass into the interior of servo piston 12 to cause the servo plunger 11 to move upwardly. This movement will move the sealing member 11B away from the servo plunger to servo piston seal 16 that is disposed at the bottom of the bore in the floating valve 14.

The fluid pressure will then be able to pass through the bore 14A in the floating valve 14. This fluid pressure will cause the floating valve 14 to move upwardly. The upward movement of the floating valve 14 defines a quantifying chamber 30 into which a measured amount of fluid will flow.

Movement of the servo plunger 11 downward causes the sealing member 11B to seat against the servo plunger to servo piston seal 16 and applies a physical force to the bottom of the bore of the floating valve 14. This places the incompressible fluid in quantifying chamber 30 under pressure which will force floating valve poppet valve 20 to open. It will be understood that the floating valve poppet valve 20 includes a floating valve poppet valve spring 19 that provides a bias against the floating valve poppet valve 20 to hold it shut. The floating valve poppet valve 20 cooperates with a floating valve poppet valve seal 21.

The stem 20A of the floating valve poppet valve 20 is disposed in axial alignment with the stem 24A of exit poppet valve 24. Both stems 20A and 24A are mutually coaxial and coaxial with the quantifying meter body 15. Thus, as the floating valve poppet valve 20 moves down in response to a fluid pressure it causes the exit poppet valve 24 to open. When both the floating valve poppet valve 20 and exit poppet valve 24 are open fluid can pass to quantifying meter fluid exit port 32. The exit poppet valve 24 includes exit poppet valve seal 25, exit poppet valve spring 26, and exit poppet valve spring retainer 27. The operation will now be described in greater detail. The description will sequentially refer to FIGS. 1A and 1B followed by FIG. 2A and 2B and then to the other Figures. The operative portions of the meters 10, 40 are connected together by any method that causes the operative components of each to move synchronously through a linear travel. Those skilled in the art will recognize that other ratios may be used in other forms of the invention. In this "closed at rest"

position all valves (as will be described hereafter) are held closed by a force A applied from to the bar 9 which is coupled to the quantifying meter link hole 29 and concentrate meter link hole 41.

Figure 2A:
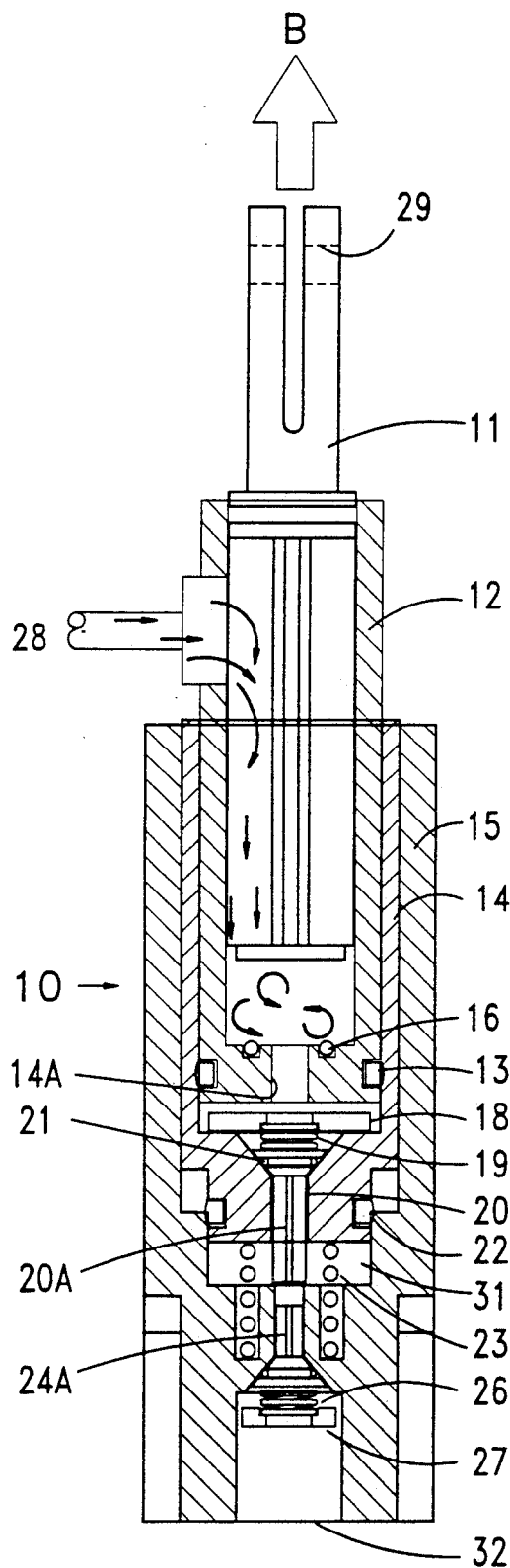
FIG. 2a is a schematic of the quantifying meter body upon initial movement of a servo plunger that is part thereof.

As best seen in FIG. 2a the quantifying meter body 15 is held stationary while the servo plunger 11 is pulled upwardly (as view) by the force B applied to the bar 9 and acting through the quantifying meter link hole 29. Fluid disposed in an external reservoir (not shown) will flow through the pressure fluid entrance port 28 past the lower extremity of the servo piston 12 and past the servo plunger 11 to the servo piston seal 16.

Figure 2B:
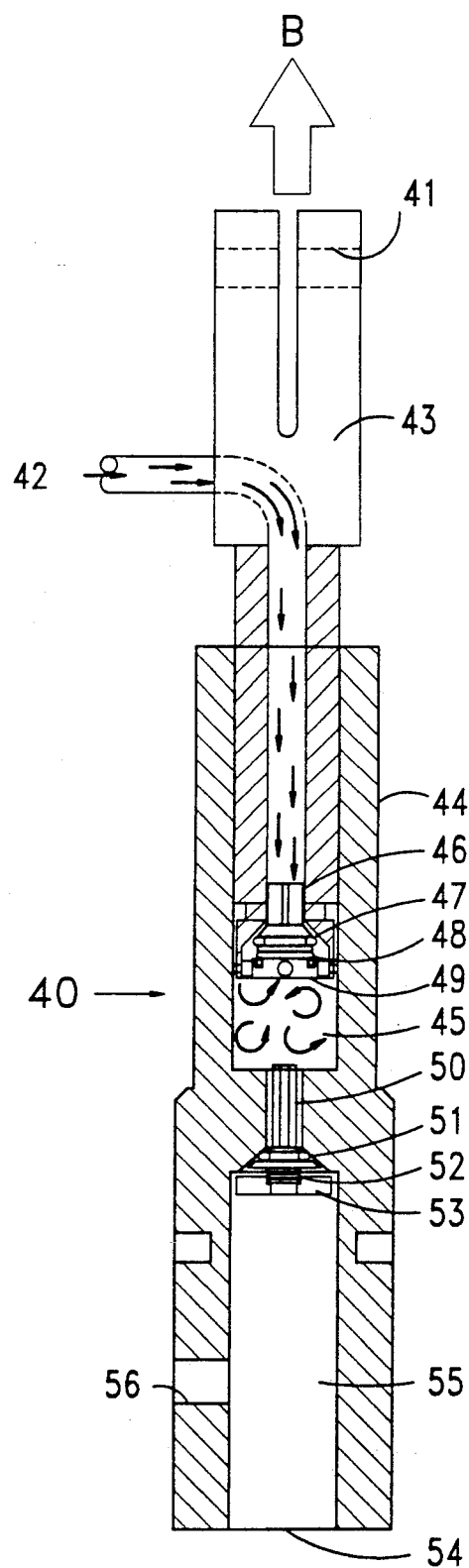
FIG. 2b is a schematic of the concentrate meter 40 upon initial movement of the a concentrate piston that is a part thereof and which moves synchronously with the servo plunger through the same linear travel.
Figure 6:
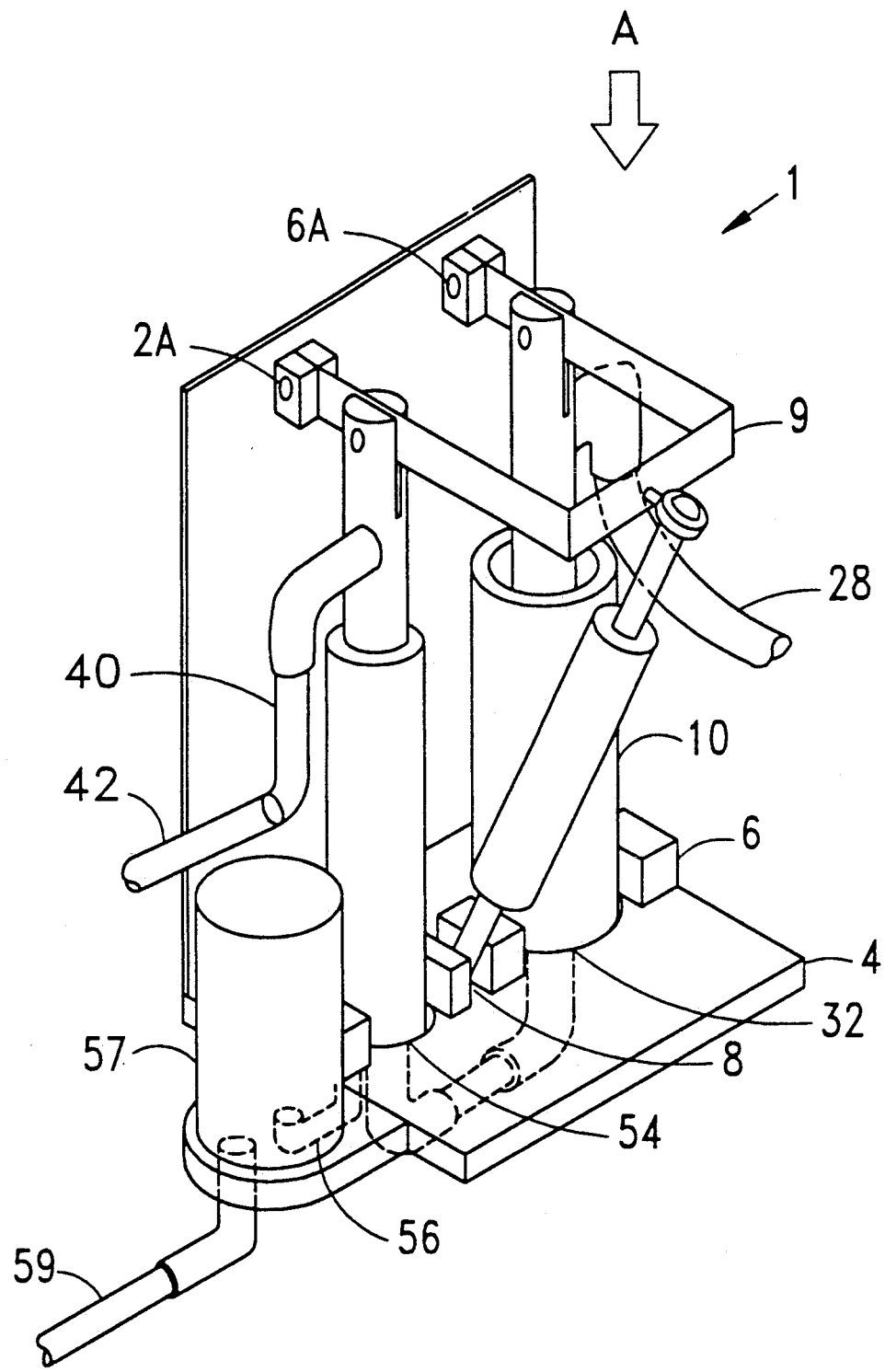
FIG. 6 is a schematic view of the entire metering pump.

As best seen in FIG. 2b the concentrate meter 40 is also linked to the bar 9 through the link hole 41. The concentrate piston 43 is pulled by the force B acting through the bar 9 coupled to the link hole 41 which causes a vacuum to occur at a concentrate entrance port 42.

Upon application of still further force B as best shown in FIG. 3a the servo plunger 11 will be move still further out of the quantifying meter body 15 which results in fluid flow in a quantifying chamber 30 defined by the servo piston 12 and a floating valve 14. This fluid is under pressure and this causes the cylindrically shaped servo piston 12 to follow the servo plunger 11.

As the servo plunger 11 is drawn away from quantifying meter body 15 fluid will flow to the quantifying chamber 30 pressure in the chamber 30 pushes the servo piston 12 out of the quantifying meter body 15. The floating valve poppet valve spring 19 will keep the poppet valve 20 closed.

As best seen in FIG. 3b, as the concentrate piston 43 is further moved out of the concentrate meter body 44 a concentrate chamber 45 is defined that fills with fluid from the concentrate entrance port 42 through the bore extending through the entire axial extent of the concentrate piston 43 past the concentrate piston poppet valve 46 and into the concentrate chamber 45.

As shown in FIGS. 4a, 4b at the top of the servo plunger 11 and concentrate piston 43 stroke in respectively the quantifying meter 10 and the concentrate meter 40 all fluid stops moving. The servo piston 12 moves up in response to the fluid pressure to meet the servo plunger 11 thereby stopping the flow of fluid by seating the servo plunger to servo piston seal 16. The quantifying chamber 30 and the pressure fluid entrance port 28 then reach equilibrium pressure. At the same time the concentrate piston 43 stops moving and the concentrate piston poppet valve spring 48 returns the concentrate poppet valve 46 to its seated position.

Both the quantifying chamber 30 and the concentrate chamber 45 have a full measure of fluid in the exact proportions they were designed to measure. In response to the force A, as best seen in FIG. 5a, as the bar 9 that is coupled to the quantifying meter 10 and the concentrate meter 40 starts to move down the force is applied to the servo plunger to servo plunger seal 16 so that fluid cannot move in a reverse direction. The force is transferred to the floating valve 14 causing it to move down with its measured amount of fluid in the quantifying chamber 30. The floating valve 14 then depresses the pressure balancing spring 23 allowing the floating valve poppet valve 20 to travel to the bottom of the quantifying meter body 15. As the floating valve 14 moves downwardly, the floating valve poppet valve 20 allows the passage of fluid pressure into the chamber 31 and thus cause compression of the floating valve poppet valve spring 19 allowing fluid in the quantifying chamber 30 to flow into the intermediate chamber 31.

When the pressure is greater in the intermediate chamber 31 than in the quantifying meter fluid exit port 32, the quantifying meter exit poppet valve 24 opens by compressing the quantifying meter exit poppet valve spring 26. Fluid then flows from the quantifying chamber 30 to the quantifying meter fluid exit port 32. When the servo piston 12 comes to the bottom of its stroke the quantifying chamber 30 is completely emptied, pressures in the quantifying chamber 30, intermediate chamber 31, and quantifying meter exit fluid exit port 32 reach equilibrium. The quantifying meter exit poppet valve spring 26 returns the quantifying meter poppet valve 24 to its closed position. As pressure is released on the link hole 29 the pressure balancing spring 23 returns the floating valve 14, servo piston 12, and the servo plunger 11 to the closed at rest position with all valves closed ready for the next cycle.

The position of the concentrate meter 40 components at the instant the quantifying meter 10 is in the position shown in FIG. 5a is best shown in FIG. 5b. The concentrate piston 43 has moved down to exert pressure on the concentrate body poppet valve 50 upsetting the equilibrium in the concentrate chamber 45. The pressure in the concentrate chamber 45 will cause the concentrate body poppet valve 50 to open and pass concentrate to the premix chamber 55. When the end of the stroke is reached all of the concentrate fluid is expelled from the concentrate chamber 45 through the port 56. Pressure is then at equilibrium in the concentrate chamber 45 and the premix chamber 55 allowing the concentrate body poppet valve spring 52 to close the concentrate body poppet valve 50. A seal 51 is provided on the concentrate body poppet valve 50. Fluid from the quantifying meter 10 enters the concentrate meter 40 at the entrance port from the quantifying meter 10 to mix with the concentrate in the premix chamber 55. In the preferred embodiment the premix chamber 55 has less volume than the concentrate chamber 45 and the quantifying chamber 30. The excess must exit through the mixed solution exit port 56. This completes one full cycle of operation in the proportioning pump system in accordance with the preferred embodiment of the invention.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. An apparatus for mixing two fluids in precise proportions which comprises:

a quantifying meter and a concentrate meter;

means connecting said quantifying meter and said concentrate meter to simultaneously operate said quantifying meter and concentrate meter;

said quantifying meter including a servo plunger including means for coupling to said means to simultaneously operate, said servo plunger being elongated and further including a piston and a sealing member, said piston and said sealing member being axially spaced, said quantifying meter also including a servo piston having a central bore in which said servo plunger is movable coaxially with respect to said piston, said piston being in sealing engagement with said central bore, said servo piston including a pressure fluid entrance port and an axially spaced outlet bore, said sealing member covering said outlet bore when said servo plunger is in a first position relative to said servo piston, said quantifying meter further including a quantifying meter body having a bore in which a floating valve is movably disposed with an outer surface of said floating valve in sealing engagement with said bore in said quantifying meter body and an inner surface of said floating valve is in sealing engagement with an outer surface of said servo piston, said quantifying meter further including a first valve means in said quantifying meter body and a second valve means in said floating valve, said first valve means cooperating with said second valve means in one position of said floating valve.

2. The apparatus as described in claim 1 wherein:
said first and second valve means have mutually aligned stems.

3. The apparatus as described in claim 2 wherein:
said first valve opens in response to movement of said floating valve.

4. The apparatus as described in claim 3 wherein:
said second valve unseats in response, in part, to movement of said servo piston relative to said floating valve.

5. The apparatus as described in claim 4 wherein:
said quantifying meter further includes a pressure balancing spring that biases said floating valve axially away from said second valve.

6. The apparatus as described in claim 5 wherein:
said concentrate meter includes a concentrate meter body and a concentrate piston.

7. The apparatus as described in claim 6 wherein:
said concentrate piston includes a concentrate entrance port extending generally axially within said concentrate piston.

8. The apparatus as described in claim 7 wherein:
said concentrate piston is elongated and includes a concentrate piston poppet valve at one axial extremity.

9. The apparatus as described in claim 8 wherein:
said concentrate meter body includes a bore and said concentrate piston is dimensioned and configured for sliding and sealing engagement with said bore.

10. The apparatus as described in claim 9 wherein:
said bore in said concentrate meter body is axially aligned with a concentrate body poppet valve for allowing passage of fluid out of said concentrate meter body.

11. The apparatus as described in claim 10 wherein:
said quantifying meter and concentrate meter each have outlet ports and said apparatus includes means connecting said respective outlet ports for fluid communication.

* * * * *